UNITED STATES PATENT OFFICE 2,349,344

INSECTICIDE

Samuel I. Gertler and Herbert L. J. Haller, Washington, D. C., assignors to the United States of America, as represented by Claude R. Wickard, Secretary of Agriculture, and his successors in office No Drawing. Application August 21, 1943, Serial No. 499,506

4 Claims. (Cl. 167—33)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to improvements in materials for destroying or checking the growth or multiplication of living organisms, whether plant or animal, which are economically injurious to man.

An object of the invention is to provide materials suitable for use as insecticides.

Another object of the invention is to provide a material for dusting or spraying delicate vegetation, such as bean plants, peach trees, and plants grown under glass, which will not cause injury to foliage.

Another object of the invention is to provide a material which is relatively non-toxic to man and domestic animals when taken by mouth, and which can be used in place of lead arsenate and other arsenicals for destroying insects, without leaving harmful residues on fruits and vegetables.

We have found that a substance belonging to the class of organic compounds known as substituted morpholines has a specific toxic effect upon harmful insects.

Specifically, this substituted morpholine is represented by the formula:

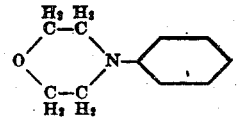

and is known as 4-phenylmorpholine.

It is understood that the substitution of other organic groups for one or more of the hydrogen atoms on the benzene ring in the above formula is also possible, for example, 4-(2',4'-dinitrophenyl) morpholine. Such compounds would also be expected to possess insecticidal properties.

The value of 4-phenylmorpholine as an insecticide is shown by the following examples:

1. When tested against newly hatched screwworm larvae by the "jar test" method, it was toxic at a concentration of 0.05 percent.

2. When dusted on pigweed leaves and fed to the Hawaiian beet webworm of the fourth instar, it gave a 100 per cent kill in three days, equal to derris.

3. When dusted on collard leaves and fed to the southern armyworm of the fourth instar, it gave a 100 percent kill in three days, equal to lead arsenate.

4. When dusted on pumpkin leaves and fed to the melon worm of the fourth instar, it gave a 100 percent kill in two days as against a 44 percent kill by derris in the same period.

5. When dusted on collard leaves and fed to the cross-striped cabbage worm of the fifth instar, it gave a 100 percent kill in two days as against an 81 percent kill by derris in the same period.

This material may be reduced to an impalpable powder by grinding and applied to vegetation either dry as a dust or made into a suspension and used as a spray. When applied as a spray in water, it may be desirable to incorporate wetting agents or stickers. The spray may be made by mechanically suspending the impalpable powder or by just dissolving it in an appropriate solvent, such as acetone or alcohol, and pouring the resulting suspension into water, whereupon a fine colloidal suspension is obtained. This may be applied directly to the host plant or may be combined with a suitable wetting agent or adhesive and then sprayed. The material may also be used in conjunction with various inert diluents, such as talc, bentonite, kaolin, pyrophyllite, and so forth.

For the control of certain types of insects, it may be advantageous to use the material in admixture with known insecticides, such as derris, pyrethrum, arsenicals, organic thiocyanates, and so forth.

Having thus described our invention, we claim:

1. The process of destroying insects which comprises treating material liable to attack by said insects with an insecticidal composition containing as an essential active ingredient 4-phenylmorpholine.

2. The process of destroying insects which comprises dusting material liable to attack by said insects with an insecticidal composition containing as an essential active ingredient 4-phenylmorpholine in the form of an impalpable powder.

3. The process of destroying insects which comprises dusting material liable to attack by said insects with an insecticidal composition comprising 4-phenylmorpholine and a carrying agent.

4. The process of destroying insects which comprises dusting material liable to attack by said insects with an insecticidal composition comprising 4-phenylmorpholine and a diluent.

SAMUEL I. GERTLER.
HERBERT L. J. HALLER.